United States Patent Office 2,961,321
Patented Nov. 22, 1960

2,961,321

PROCESSES FOR IMPROVING THE FLAVOR OF MEATS

Beverly E. Williams, Hillsborough, Calif., assignor to Hodges Research and Development Company, New York, N.Y., a corporation of California No Drawing. Filed Oct. 29, 1957, Ser. No. 693,011

5 Claims. (Cl. 99—107)

This invention relates to processes for improving the flavor of meats and more particularly to such processes in which the mycelium of the mold Aspergillus not before known as flavor enhancing agent is injected into meats immediately after slaughter while the tissues are still fluid and flaccid.

Heretofore various enzymes derived from the molds Aspergillus and the proteolytic enzymes have been proposed for use in tenderizing of meats. It has heretofore been proposed to either introduce these enzymes into the meat by pumping through the vascular system under pressure or by injecting into the meat after the meat has been chilled. Introduction of these enzymes through the vascular system is an objectional and expensive process so far as the meat industry is concerned because of the large volume of fluid required to fill the vascular system and the body organs of the carcass and because poor distribution of the enzymes is obtained with resultant spotty tenderizing. Improvement of flavor by such known processes appears to be negligible.

Injection of these known enzymes into the carcass after the carcass has been chilled and rigor mortis has occurred produces a very unsatisfactory tenderizing since once the meat and fat of the carcass are congealed distribution of the enzyme from the point of injection is limited resulting in over-tenderization in spots and none in others and no enhancement of flavor.

Further, some proteolytic enzymes have continuous action and this action must be arrested or stopped before the meat is spoiled by over-tenderization. Action of these enzymes is stopped by freezing or cooking. This is undesirable since precooked of frozen meat cannot be sold as fresh meat. Over-tenderization detracts from flavor.

I have found that the flavor of meats can be greatly enhanced without substantial improvement in tenderness by the use of the mycelium of the Aspergillus mold, particularly the *Aspergillus niger* used in citric acid production process.

It is therefore an object of this invention to provide a method whereby the objectionable "bland" or "green" flavor of meat may be converted to an "aged" flavor without in any way detracting from other desirable qualities of the meat.

I have found that the appropriate time to inject the mycelium of *Aspergillus niger* into the carcass is immediately after slaughter while the tissues are still fluid and flaccid and before incipient rigor mortis. The amount of fluid containing the mycelium injected into the carcass is preferably proportional to the normal moisture loss during chilling of the meat being treated. It is known that carcass beef loses approximately 1% of its natural moisture during the first 24 hours in the cooler and another 1% during the next five to seven days. The quantity of fluid containing the mycelium should be equal to and not less than the amount of moisture lost by the beef during the first 24 hours of chilling and not greater in amount than the moisture lost by the beef during ordinary commercial practices. For treating a beef carcass by the present invention I prefer, therefore, to use fluid containing the mycelium weighing approximately 1 to 2% of the weight of the beef carcass. Thus the fluid containing the mycelium serves to replace the moisture lost by the beef during chilling and cold storage and the beef is not softened or unduly moistened by addition of an amount of fluid equivalent to the amount of moisture lost by the beef.

I prefer to introduce the mycelium in its fluid or aqueous carrier into the meat to be treated by the injection method. The fluid containing the mycelium is introduced into the carcass through a hollow needle which is introduced into the portions of the carcass to be treated at rather closely spaced intervals. For convenience this type of injection may be termed "stitch pumping."

A representative eviscerated carcass of beef may weigh approximately 600 pounds and, when divided into halves, each side will weigh approximately 300 pounds. Such a carcass will lose approximately 6 pounds of moisture initially or 3 pounds of moisture for each side. According to the present invention therefore a minimum of 3 pounds of the tendering fluid containing the mycelium is used for each side and a maximum of up to six pounds of the fluid may be employed. An average for such a side of beef is 4 pounds of the fluid containing the mycelium. As noted above this fluid is introduced by stitch pumping. The 4 pounds are distributed into the half carcass by injecting approximately a pound of the fluid into the round; another pound is pumped into the muscle of the loin; another pound is pumped into the rib; and the remaining pound is pumped into the chuck and distributed through the neck and front shank. This provides adequate distribution throughout the entire carcass and results in uniform flavor enhancement of the beef.

After the meat has been treated in accordance with the process described above it is chilled in the normal way and handled by conventional practice. When the mycelium containing fluid is pumped into the meat as described above there will be no trace of the fluid since the warm, fluid, flaccid muscles before rigor mortis absorb and distribute the fluid without trace.

The mycelium of Aspergillus is sterilized to kill any living organisms and is then dried and powdered before introduction into solution and so does not require freezing or cooking to prevent over-flavoring of the meat. Meat treated according to the present invention exhibits enhanced "aged" flavor within a short time after treatment of the carcass.

I have further found that improved flavor is obtained if the fluid containing the mycelium of Aspergillus is introduced into the warm carcass on the killing floor at a temperature approximating 118° F. Carcasses of beef, lamb, veal, pork and other animals when first killed and dressed have a normal body temperature of approximately or above 98.6° F. If the fluid containing the mycelium is introduced into the meat at a temperature above 98.6° F. or normal animal body temperature and below a temperature which would cause searing or cooking of the meat, 120° to 125° F., the fluid will elevate the body temperature of the normally dressed meat and will improve the color and appearance of the meat as well as activate the natural enzymes thus causing an improved and accelerated aging and flavoring action. The additional heat introduced by the fluid containing the mycelium and heated to approximately 118° F. has the beneficial effect of keeping the carcass warm for an hour or more of treating time, providing better distribution throughout the carcass of the flavoring fluid. Any improvement in tenderness is probably occasioned by the action of the heated fluid under pressure and probably cannot be attributed to the action of the mycelium of Aspergillus.

The mycelium of Aspergillus is readily obtainable. A number of processes have been developed whereby a solution of sugars of various kinds is inoculated with *Aspergillus niger* for the purpose of producing citric acid. A mat consisting primarily of the mycelium of the fungus grows on top of the solution and through reactions which are not thoroughly understood the sugars are converted, to a greater or less extent, to citric acid. The efficacy of the fungus in effecting this conversion fall off rapidly when it starts to sporulate. When this occurs the mat is removed; is placed in a filter press; and the moisture, including the acid and remaining sugars, is expressed from it insofar as possible. The mycelium mat is a waste product which is available in large quantities. The mycelium mat may or may not be washed prior to the filtering in order to remove as much as possible of the sugar and citric acid solution, but whether it has been treated in this manner or not appears to make no difference in the flavor of the resultant meat product.

The resultant mycelium mat or filter cake, which may be obtained in this fashion, is then thoroughly dried and is then ground to the desired particle size. The degree of grinding is largely a matter of choice. Fairly coarse particles, comparable in size to the coarsely ground pepper supplied from the hand mills which are familiar on many tables, may be used or the mat may be completely pulverized. The preferred size of particle is approximately the same as that of ordinary table salt, or such as facilitate suspension and solution in the injection medium.

The ground dried mycelium as described may be mixed with a substantially equal amount, by weight, of table salt, or other suitable taste or flavor additives, the two ingredients being thoroughly mixed. The proportions are not at all critical, but the average taste seems to be best met by equal proportions; enough of the mixture to salt to taste the meat to which it is applied with sufficient Aspergillus flavor to give the meat the required zest.

It is not, of course, necessary that *Aspergillus niger* which has been used for the production of citric acid be employed in the practice of the present invention. The fungus can be cultivated specifically for the purpose of preparing the mycelium but because of the ready availability of the Aspergillus mats as a by-product, substantially all of which is now wasted, the by-product mats are the logical source of supply.

It is not necessary to include salt with the mycelium, except that it might be helpful in preserving it while dry and is also not unbeneficial to the meat. Salt has no, or perhaps questionable, tenderizing effect upon meat, but the meat seems somewhat more tender and juicy because of the hydroscopic properties of the salt in drawing and holding moisture.

The amount of flavoring material per carcass produces best flavoring results in the range of .05% to .2% of the weight of the carcass. Using .2% of the weight of the carcass (600# beef) 19.2 oz. or 540 grams would be used per beef. This is dissolved in an amount of solution equal to about 1% of the carcass weight or about 6 pints of fluid per carcass. Six pints of fluid equals 2839 grams containing 540 grams of mycelium product—or 18.10%. The amount of salt added to this is discretionary, but within the limits, perhaps somewhat lower, than is normally used on meat, so as to permit additional salting during cooking or at the table, without making the meat too salty.

It will now be apparent to those skilled in the art that by the present invention I have provided novel processes for the enhancement of the flavor of meats which in every way provide the several advantages discussed above.

Changes in or modifications to the above described processes may now be suggested to those skilled in the art without departing from by inventive concept and reference should therefore be had to the appended claims to determine the scope of this invention.

What is claimed is:

1. In a process for enhancing the flavor of meats without tenderizing the meats the step of injecting the freshly slaughtered carcass while warm and flaccid before rigor mortis with a solution containing approximately 18% by weight of the sterilized mycelium of Aspergillus from citric acid production and thereafter cooling and storing the meat.

2. A process according to claim 1 in which the mycelium is dispersed in a fluid solution in amount approximately 18% by weight of the solution, the solution containing approximately equal amounts of table salt and mycelium and the solution weighing about 1% of the weight of the carcass being treated.

3. A process according to claim 1 in which the mycelium is dispersed in a fluid heated from approximately 98.6° F. to approximately 118° F. before injection into the carcass.

4. A process according to claim 1 in which the mycelium is dispersed in a fluid weighing approximately 1% weight of the meat to be treated and the fluid is heated to a temperature in the range from 98.6° F. to 118° F. before injection into the carcass.

5. In a process for enhancing the flavor of meats, the step of stitch pumping the carcass with a solution containing approximately 18% by weight of the sterilized mycelium of *Aspergillus niger* from citric acid production at from approximately 98.6° F. to approximately 118° F. and weighing from approximately 1% by weight of the meat to be treated while the carcass is warm and flaccid and before rigor mortis and then cooling and storing the carcass.

References Cited in the file of this patent

UNITED STATES PATENTS

| | | |
|---|---|---|
| 2,221,689 | Jensen | Nov. 12, 1940 |
| 2,805,163 | Williams et al. | Sept. 3, 1957 |
| 2,825,650 | Shahrok | Mar. 4, 1958 |